United States Patent

Halsall et al.

[15] 3,673,302
[45] June 27, 1972

[54] METHOD FOR FABRICATING BATTERY CASES

[72] Inventors: Vincent Michael Halsall, Bayside, Wis.; Peter Anthony Cosme, Lockport, Ill.

[73] Assignee: Globe-Union Inc., Milwaukee, Wis.

[22] Filed: Aug. 19, 1968

[21] Appl. No.: 798,205

Related U.S. Application Data

[62] Division of Ser. No. 608,104, Jan. 9, 1967, Pat. No. 3,509,603.

[52] U.S. Cl. .............................264/328, 264/318, 264/334
[51] Int. Cl. .............................................................B29f 1/14
[58] Field of Search .....................264/328, 334, 336, 318; 18/42 D, 42 M; 249/64, 176

[56] References Cited

UNITED STATES PATENTS

| | | | |
|---|---|---|---|
| 2,958,904 | 11/1960 | Morin | 264/297 X |
| 3,424,831 | 1/1969 | Spatz | 264/318 X |
| 3,477,095 | 11/1969 | Lensky | 18/42 X |
| 1,394,558 | 10/1921 | Klug | 264/248 |
| 2,330,369 | 9/1943 | Marsh | 18/42 D |
| 2,542,263 | 2/1951 | Schultz | 264/328 X |
| 2,592,296 | 4/1952 | Kutik | 264/328 X |
| 3,243,752 | 3/1966 | Lawrence | 264/328 X |
| 3,296,353 | 1/1967 | Nouel | 264/328 X |
| 3,402,713 | 9/1968 | Senkowski et al. | 264/334 X |

FOREIGN PATENTS OR APPLICATIONS

| | | | |
|---|---|---|---|
| 962,726 | 12/1949 | France | 264/328 |

*Primary Examiner*—Robert F. White
*Assistant Examiner*—Richard R. Kucia
*Attorney*—Pendleton, Neuman, Seibold & Williams

[57] ABSTRACT

A molding method for injection molding long thin walls of uniform thickness such as the walls of a battery case. The uniform thickness walls are molded between cores. The pressure at the walls is relieved, preferably by withdrawing some of the cores, before the molded part is entirely separated from the mold. Dimensional stability is improved by rigidly supporting the mold cores during the initial stage of plastic injection.

2 Claims, 4 Drawing Figures

Patented June 27, 1972

INVENTORS
VINCENT M. HALSALL
PETER A. COSME
BY PENDLETON, NEUMAN
SEIBOLD & WILLIAMS

ATTORNEYS

INVENTORS
VINCENT M. HALSALL
BY PETER A. COSME
PENDLETON, NEUMAN
SEIBOLD & WILLIAMS
ATTORNEYS

INVENTORS
VINCENT M. HALSALL
PETER A COSME

METHOD FOR FABRICATING BATTERY CASES

This application is a division of application Ser. No. 608,104 filed Jan. 9, 1967, now U.S. Pat. No. 3,509,603, issued May 5, 1970.

Typical prior art storage battery cases are made of rubber composition with wall thicknesses generally in excess of 0.20 inch. Thick walled rubber cases are heavy and the relatively thick walls limit the volume available for acid. Low acid volume results in low battery capacity. It is therefore desirable to fabricate battery cases with the thinner sections of the walls less than 0.10 inch from a lightweight, thermoplastic such as polypropylene.

One of the most economical methods for producing thermoplastic parts is injection molding. Briefly, this process involves injecting a thermoplastic material heated to a liquid state into a multi-piece mold. The mold defines the configuration of the part to be manufactured. The thermoplastic material hardens, the mold pieces separate, and the part is ejected.

Injection molding of relatively large, thin-walled battery cases poses some unique problems. To facilitate separation of mold pieces in a conventional injection molding process, long thin walls of the molded part are made with a rather appreciable draft or taper. However, the side and wall portions of a battery case, especially a thin-walled battery case, are preferably of approximately uniform thickness throughout. Unlike tapered walls, uniform thickness walls have no thick portions to reduce acid volume, and no thin portions of high stress concentration. Attempted fabrication of uniform thickness walls by conventional molding techniques has resulted in the walls being torn from the rest of the part as the mold pieces are separated.

Furthermore, since the battery walls are relatively long the mold must contain a plurality of relatively long cores. Long cores tend to move as plastic is injected into the mold thus preventing accuracy and uniformity in wall thickness.

It is therefore an object of the present invention to provide a novel method and apparatus for producing battery cases.

It is a further object of the present invention to provide a novel injection molding technique for fabricating thin wall battery cases.

It is a further object of the present invention to provide a novel mold for injection molding thin wall battery cases.

It is a further object of the present invention to provide a novel method and apparatus for injection molding long thin walls of uniform thickness.

Briefly, the above objects may be accomplished in an injection molding apparatus which performs one or more of three functions: (1) during an initial plastic filing period the mold cores are rigidly secured at two ends, but after the initial period the support at one end of the cores is withdrawn permitting complete filling of the cavity; (2) after an initial setting period and before the part is entirely separated from the cores, the pressure at the walls of the part is relieved and; (3) the part is removed from the stationary part of the mold before it is entirely hardened.

In a preferred embodiment, the first of these functions is accomplished by securing each core at one end in a conventional manner and at its other end to the stationary part of the mold by a plurality of movable pins. While securing the cores, the movable pins occupy space to be filled with plastic. While the plastic is being injected into the mold, and before the plastic hardens, the pins are removed from the cores a distance so that they are flush with the remainder of the stationary portion of the mold. The plastic continues to flow and fill the holes left by the pins.

The second function mentioned above is accomplished in a preferred embodiment of the invention by separating the part from the cores in two steps. First, some of the cores are removed to relieve pressure at the walls. Next, the part is separated from the remaining cores.

The third function is performed by removing the part from that portion of the mold corresponding to the outer face of the battery case before the part is separated from the alternate cores.

A more detailed description of the present invention will be given with reference to the accompanying drawings in which.

Figure 1:
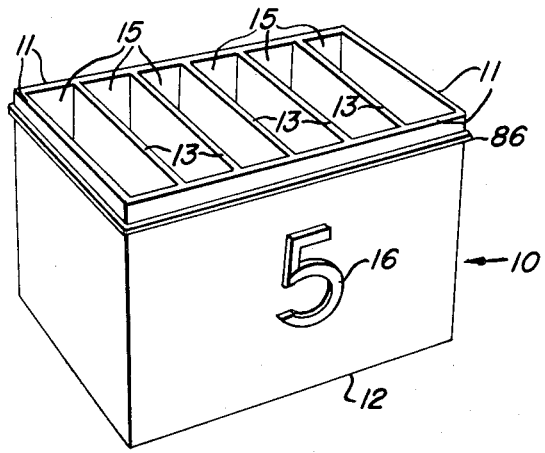
FIG. 1 is an isometric view of a storage battery case.

FIG. 1 illustrates a battery case 10 which might be used, for example, in the manufacture of an automobile storage battery. The case includes four side portions 11, a bottom portion 12, and a plurality of interior wall portions 13. Generally, at least one outer side wall of the battery has a raised portion 16 including lettering or merely a textured surface. The side and wall portions form six cavities 15 which house six corresponding battery cells (not shown) when the battery is completed. A cover portion (not shown) is fitted over the top of the cavities 15 to form the complete battery.

Each of the six cavities 15 of a completed battery contains a sulphuric acid electrolyte. The volume of battery acid, which is a primary factor determining battery capacity, is limited by the volume occupied by the battery cells and by the walls forming the cavities. For a battery of fixed overall dimensions, reduction in wall thickness results in an appreciable increase in the volume of acid contained within the battery. It is therefore advantageous to fabricate the battery case from a thermoplastic material such as polypropylene which enables construction of walls less than 0.10 inch thick with a substantial increase in acid volume and battery capacity. Additional advantages of polypropylene are its light weight and strength. The optimum dimensions for the case depend, of course, on its use. For normal automotive purposes, the walls may have an average thickness of about 0.085 inch. The bottom portion may be slightly thicker, e.g., about 0.095 inch. The overall dimensions for such a case might, for example, be 6 inches × 8 inches × 10 inches.

As mentioned above, one of the most economical methods of producing thermoplastic parts is injection molding. If the battery case shown in FIG. 1, however, were manufactured along conventional injection molding techniques the side and wall portions 11, 13 would have to be appreciably tapered to be thickest at the bottom and thinnest at the top of the case. A taper, or draft, of approximately 0.025 to 0.030 inch per inch is necessary in conventional molding in order to facilitate the removal of the mold cores, which form the six cavities, 15, without damage to the molded part. When one attempts to pull cores in conventional systems having little or no taper then the cores tend to tear the wall portions from the rest of the case.

On the other hand, tapered walls are not entirely consistent with the advantages of thermoplastic cases set out above. With tapered walls either strength of the battery case or acid volume capacity has to be sacrificed. A sufficiently strong battery case must have a minimum wall thickness which would correspond to the thinnest portion of the tapered wall. The remainder of the wall would have to have an increased thickness due to the taper. The increased thickness requires extra material and decreases acid capacity.

A mold constructed according to the present invention, however, permits fabrication of walls having approximately uniform thickness. A negligible taper on the order of 0.025 inch per inch may advantageously be employed without the disadvantages of the large conventional taper.

Figure 2:
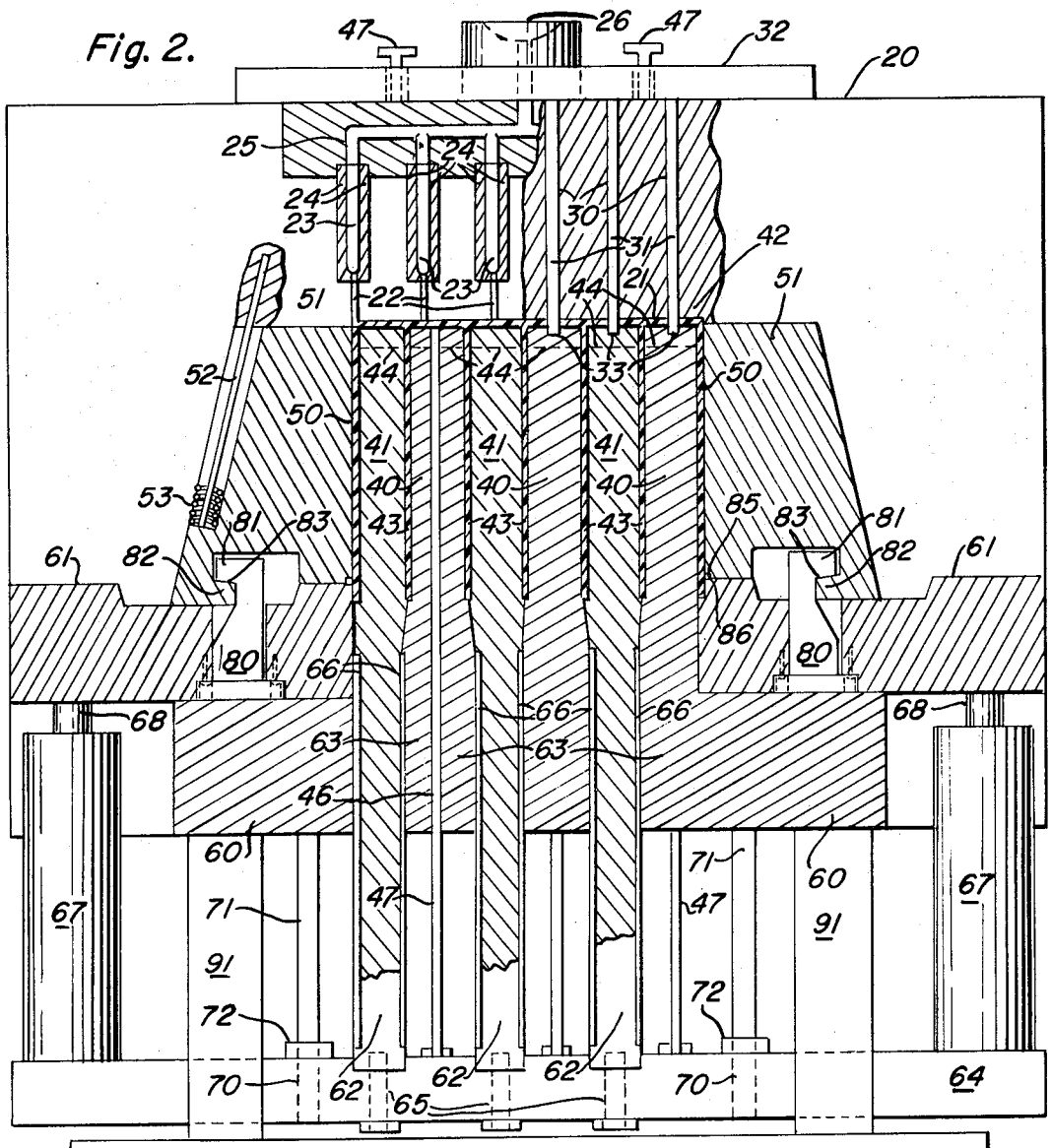
FIGS. 2 and 3 are sectional top and side views, respectively, of an injection mold constructed according to the present invention.
Figure 3:
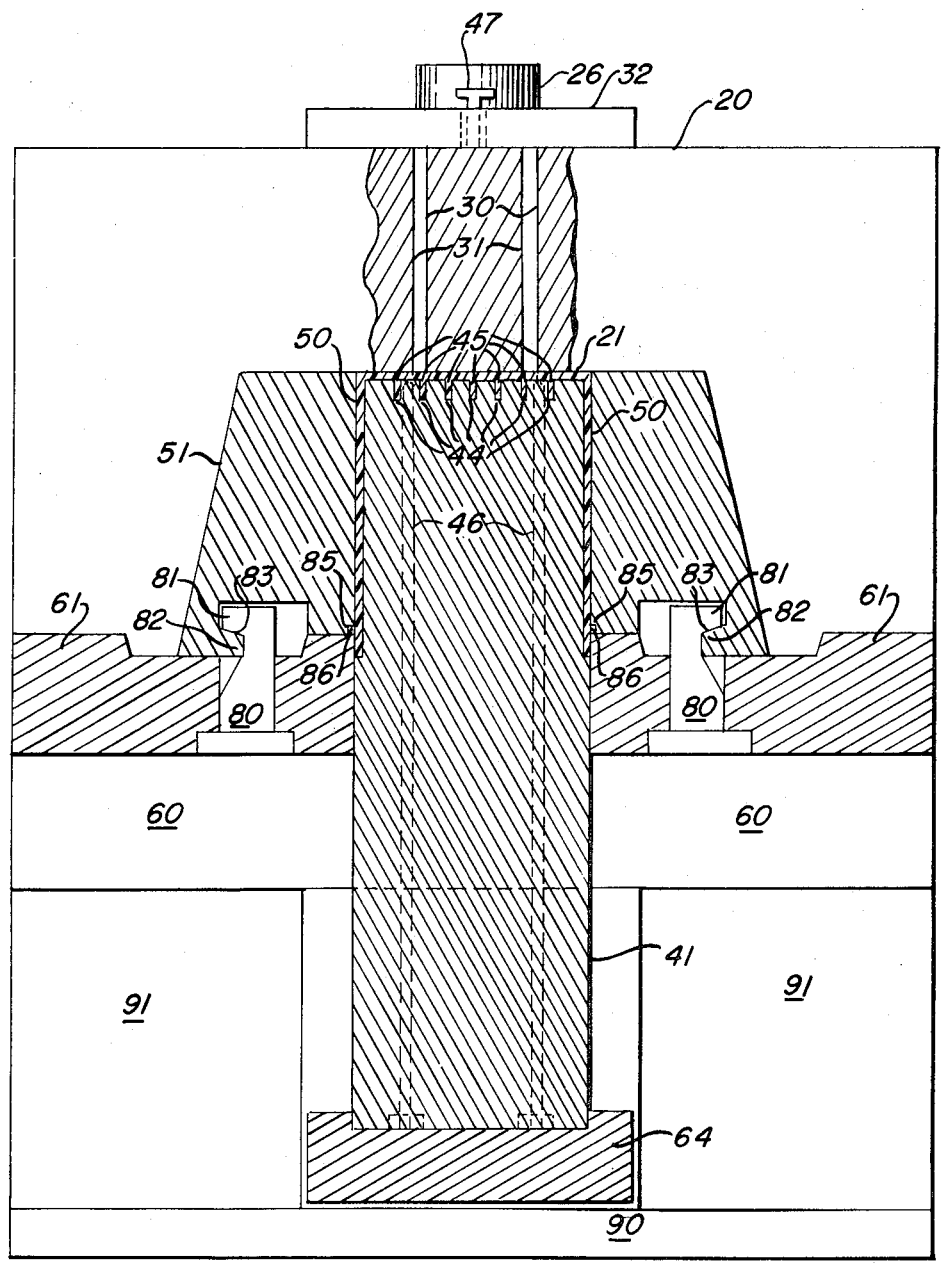

FIGS. 2 and 3 are cross sectional views of an injection mold for fabricating battery cases according to the present invention. The illustration of FIGS. 2 and 3 is intended to set forth the novel features of one embodiment of the present invention. Some features which are conventional in injection mold construction have not been illustrated for the sake of simplicity of description. For example, all the mold parts advantageously include conventional cooling channels which are not illustrated.

The mold includes a first part 20, generally termed a stationary part, which is rigidly secured to a conventional injection molding machine (not shown). A flat, relatively rectangular, face 21 of the stationary part 20 forms the bottom portion of a mold cavity in the shape of the battery case.

The stationary part 20 includes a plurality of runners 22 connected to conventional injection molding heads 23, including heating elements 24, which in turn are connected through additional channels 25 to an injection nozzle 26. The nozzle 26 is connected to the plastic injection portion of the molding machine (not shown). Plastic injected from the machine travels through the nozzle 26 to the runners 22 and eventually to the portion of the mold formed by the face 21. The design of the plastic injection system follows conventional practices of the molding art.

The stationary part 20 also contains twelve bores 30 containing pins 31 mounted for axial movement therein. The pins 31 are connected on one end to a plate 32 which is movable to and from the stationary part 20. At their other ends, the pins 31 project into recesses 33 formed in a plurality of movable cores 40, 41. Stop members 47 are provided to limit the movement of the plate 32 so that the pins 31 can be moved back just far enough to be flush with the face 21.

The cores 40, 41 form the inside of the bottom portion 42 and the interior wall portions 43 of the mold cavity. Near the bottom 42 of the mold cavity a plurality of channels 44 are formed in the mold cores 40, 41. The channels 44 form a plurality of projections 45 (FIG. 3) which support the battery plates in the completed battery.

The outer side portions 50 of the mold cavity are formed by four members 51 which are slidably mounted on rods 52 rigidly connected to the stationary part 20 of the mold. Each rod 52 carries a spring 53 connected to both the rod 52 and the slidable part 51. The spring 53 tends to urge the slidable part 51 away from the stationary part 20. One or all of the four faces of the four slidable parts 51 will generally be raised. For example, one or more of the four faces may form a figure 16 such as that shown on the case in FIG. 1.

The first three movable cores 40 are rigidly secured, and preferably formed integrally with, a large plate 60 which rests against a stripper plate 61. The other three cores 41 are formed integrally with a number of projections 62 which are secured to a second plate 64 by suitable fasteners 65. A plurality of wear strips 66 are positioned in the projections 62 to provide a surface along which the engagement portions 63 of the first plate 60 slide. Attached to the plate member 64 are two hydraulic cylinders 67 of conventional design. The two movable plungers 68 of the two hydraulic cylinders 67 are connected to the stripper plate 61. When the two cylinders 67 are actuated, the plate 64 supporting the cores 41 separates from the stripper plate 61. Each of the first three cores 40 includes two air passages 46 for contacting air hoses 47 which may assist in part ejection.

Holes 70 are formed in the second core plate 64 to permit guide pins 71 attached to the first core plate 60 to pass therethrough. Also, two stop members 72 are provided to limit the motion of the first core plate 60, when, as explained below, it moves toward the second core plate 64.

The stripper plate 61 carries four engagement members 80 which have projections 81 adapted to engage complementing projections 82 on the four slidable members 51. The interface 83 between the projections 81, 82 is set at an angle which allows the members 81, 82 to slide relative to one another in an operation where the members 80 pull the slidable members 51 away from the stationary part 20 of the mold.

A recess 85 is formed in each of the four slidably mounted members 51 to permit a lip portion 86 to be formed on the upper end of the battery case. One side of the lip portion 86 engages the stripper plate 61.

A drive plate 90 is rigidly connected to the first core plate 60 by suitable members 91. A drive mechanism in the molding machine is connected to the drive plate 90 in the conventional manner.

With the mold in its closed position, as shown in the drawing, plastic in a liquid state is injected into the mold cavity in a conventional manner. It is desirable that the plastic be a high tensile strength, high impact strength, mar resistant, thermoplastic hydrocarbon. For example, a polypropylene or modified copolymer of polypropylene having the following characteristics has been found suitable:

1. a specific gravity of 0.85 to 1.05;
2. a tensile yield strength (at 2 inches per minute on a ⅛ inch thick specimen) of approximately 4,000 p.s.i. when tested in accordance with ASTM test method D638–61T;
3. a modulus in flexure (at 0.05 inches/minute on a ⅛ inch thick specimen) of approximately 180,000 p.s.i. when tested in accordance with ASTM test method D790–63; and
4. a Rockwell hardness range of 63 to 95 when tested in accordance with ASTM test method D785–60T.

Other suitable materials may be low pressure polyethylene and high impact polystyrene.

The liquid plastic is injected through the nozzle 26 to the plurality of runners 22. The heating elements 24 maintain the plastic in a liquid state. The 12 core supporting pins 31, which are positioned in recesses 33 in the six cores 40, 41 hold the cores 40, 41 in a stationary position while the plastic is being injected into the mold. In this way the flowing plastic cannot move the cores 40, 41 and a high degree of dimensional stability is achieved. As soon as the cavity is completely filled with plastic, and while the plastic is still in a very liquid state, the pin supporting plate 32 is moved away from the stationary part 20 and the pins 31 are removed from the cores 40, 41. The pins 31 are moved back a distance so that their ends are flush with the face 21 of the cavity formed by the stationary part of the mold. Liquid plastic then fills the spaces in the cavity previously occupied by the pins 31. Since the plastic supplying channels 22, 25 are not closed to the cavity, the additional material necessary to fill the pin spaces is supplied through the injection system.

Figure 4:
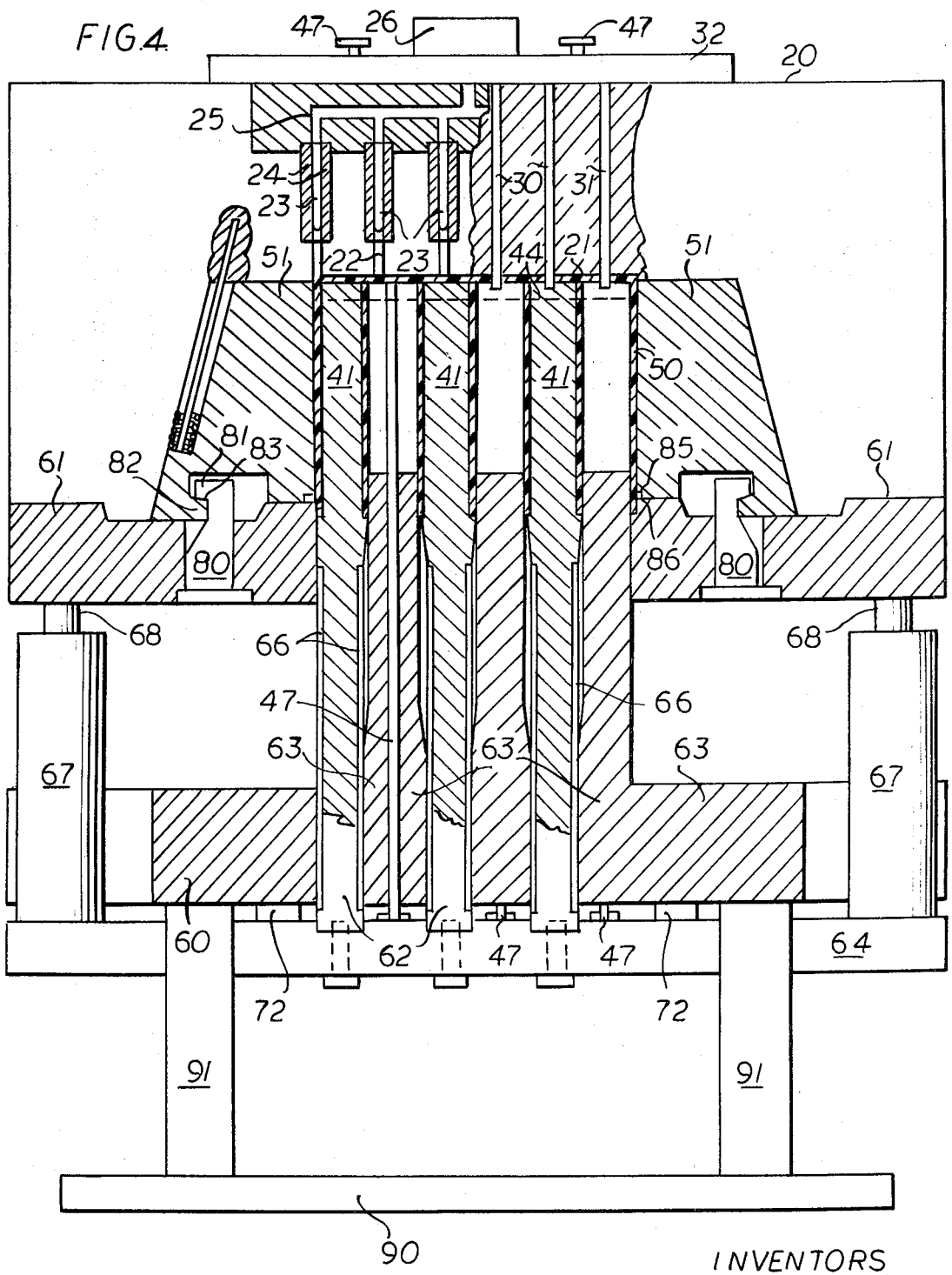
FIG. 4 is a sectional top view showing the mold in an intermediate stage of the operation.

After an initial period of hardening, e.g., about 30 seconds for a part of the dimensions here involved, during which water or other cooling fluid is circulated through all the mold parts in a conventional manner, the drive plate 90 of the mold, which is connected to the movable platen of the injection machine (not shown) is moved away from the mold causing removal of the first three mold cores 40 from the cavity. This position of the mold is shown in FIG. 4. Removal of only the first three cores 40 relieves the pressure on the wall portions of the part. Pressure is relieved not only at the walls immediately adjacent the removed cores, but also at the one outer wall which is not adjacent to a removed core. It is not generally necessary to remove the core adjacent a wall to relieve pressure at the wall although it is convenient to do so.

As the drive plate 90 continues moving, the first core plate 60 engages the stop members 72. The remaining three cores 41 and the stripper plate 61 then move away from the mold. The stripper plate 61 carries the four slidably mounted portions 51 away from the mold. The plastic mold part is removed from the cavity because it grabs the three remaining cores 41.

As the four slidably mounted members 51 move along the rods 52 out of the stationary part 20 of the mold, the faces of these members 51, which form the four outer side portions of the battery case, move perpendicularly relative to the side portion. This perpendicular motion prevents damage to any raised portion on the outer part of the battery case.

When the plastic part is completely hardened, which requires approximately another 15 or 20 seconds, the two hydraulic cylinders 67 are actuated and the stripper plate 61 removes the case from the remaining cores 41. The part then falls out of the mold and the mold is ready to form another battery case. The drive plate 90 is moved to close the mold and the process is repeated.

While the invention has been described with respect to a preferred embodiment, it should be noted that the invention is not limited to the preferred embodiment. The scope of the invention is defined by the following claims.

What is claimed is:

1. The process of injection molding a battery container having a bottom portion, a plurality of side portions, and a plurality of long thin interior wall portions, said interior wall portions being parallel to one another and to two of said side portions, the thickness of the major portion of said walls being no greater than about 0.10 inch and having a taper of no more than about 0.0025 inch per inch, comprising the steps of:
   a. providing a mold including a first section for forming the outer portion of said container, including said side and bottom portions, and a plurality of cores positioned with respect to said first section to form the inner portions of said side and bottom portions and the interior walls of said container,
   b. maintaining a rigid connection between said cores and said first sections at the portion of said cores corresponding to said bottom portions,
   c. injecting a thermoplastic material into said mold and disestablishing said rigid connection before said thermoplastic material hardens,
   d. removing only alternate ones of said cores from said mold subsequent to plastic injection and after an initial period of hardening,
   e. separating the remaining cores from said first section whereby said plastic remains attached to said cores and separates from said first portion, and
   f. removing the plastic from said cores.

2. The process of injection molding a battery container having a bottom portion, a plurality of side portions, and a plurality of long thin interior wall portions, said interior wall portions being parallel to one another and to two of said side portions, the thickness of the major portion of said walls being no greater than about 0.10 inch and having a taper of no more than about 0.0025 inch per inch, comprising the steps of:
   a. providing a mold including a first section for forming the outer portion of said container, including said side and bottom portions, and a plurality of cores positioned with respect to said first section to form the inner portions of said side and bottom portions and the interior walls of said container,
   b. injecting a thermoplastic material into said mold,
   c. removing only alternate ones of said cores from said mold subsequent to plastic injection and after an initial period of hardening,
   d. separating the remaining cores from said first section whereby said plastic remains attached to said cores and separates from said portion, and
   e. removing the plastic from said cores.

* * * * *

UNITED STATES PATENT OFFICE
CERTIFICATE OF CORRECTION

Patent No. 3,673,302        Dated June 27, 1972

Inventor(s) Vincent Michael Halsall and Peter Anthony Cosme

It is certified that error appears in the above-identified patent and that said Letters Patent are hereby corrected as shown below:

Column 2, line 63, "0.025" should be -- .0025 -- ;

Column 5, line 15, (Claim 1) delete "said" before "first" ;

Column 6, line 22, (Claim 2) insert -- first -- before "portion" .

Signed and sealed this 15th day of May 1973.

(SEAL)
Attest:

EDWARD M. FLETCHER, JR.         ROBERT GOTTSCHALK
Attesting Officer        Commissioner of Patents